United States Patent [19]

Kashihara et al.

[11] Patent Number: 4,842,936
[45] Date of Patent: Jun. 27, 1989

[54] COMPOSITE BASIC RESIN PARTICLES, ITS PREPARATION AND RESINOUS COMPOSITION FOR COATING USE CONTAINING THE SAME

[75] Inventors: Akio Kashihara, Osaka; Keizou Ishii, Hyogo; Shinichi Ishikura, Kyoto, all of Japan

[73] Assignee: Nippon Paint Co., Ltd., Osaka, Japan

[21] Appl. No.: 932,161

[22] Filed: Nov. 18, 1986

[30] Foreign Application Priority Data

Nov. 19, 1985 [JP] Japan ................................ 60-259348

[51] Int. Cl.$^4$ .......................... B32B 5/16; C08L 63/00
[52] U.S. Cl. ..................................... 428/407; 523/400;
523/454; 523/455; 523/456; 523/463; 524/535;
524/542; 524/923; 525/293; 525/518; 525/529;
427/385.5; 427/393.5
[58] Field of Search ............... 525/445, 518, 529, 293;
523/400, 454, 455, 456, 463; 428/407; 524/535,
542, 923

[56] References Cited

U.S. PATENT DOCUMENTS 4,119,581 10/1978 Rembaum ............................ 521/27

Primary Examiner—Theodore E. Pertilla
Attorney, Agent, or Firm—Woodcock Washburn Kurtz Mackiewicz & Norris

[57] ABSTRACT

Composite basic resin particles each of which comprises a granular body portion of crosslinked polymer having a mean diameter of 0.01 to 10$\mu$ and a number of linear polymer chains, a part of the respective linear polymer chain penetrating into the inside of the granular body portion and the remaining part extending outwardly therefrom, and at least part of said linear polymer chains bearing basic functional groups selected from amino groups and ammonium group. A dispersion of said composite basic resin particles in an organic solvent is useful as a resinous vehicle for coating compositions.

7 Claims, No Drawings

COMPOSITE BASIC RESIN PARTICLES, ITS PREPARATION AND RESINOUS COMPOSITION FOR COATING USE CONTAINING THE SAME

FIELD OF INVENTION

The present invention relates to composite basic resin particles and a dispersion of said particles in an organic solvent medium.

BACKGROUNDS OF THE INVENTION

Granular resins are supplied in the forms of emulsions, microgels, non-aqueous dispersions and powder resins, and have been watched with keen interest in paint industries, as an eminent approach to the ideal aqueous paints, high solids paints and powder paints which will fulfill the requirements of economization of natural resources, energy-saving and conservation of good surroundings.

They are used each singularly or in combination form with other soluble type resins and are believed to act as a binder, a rheology regulator or a polymer filler. Thus, a high quality film can be obtained therewith.

However, when the granular resin is used alone, it is unable to get a uniform or excellent film and the resulted film has a serious drawback of being deficient in film appearance. Even when the granular resin is combined with a soluble type resin, there is a case wherein the viscosity of the combined system is greatly increased as compared with that of the soluble type resin alone due to the considerable interaction between the surfaces of granules and soluble type resin. Therefore, a great care is often required in the actual use of such combined resins.

The inventors have previously found that the composite resin particles, each of which comprises a granular body portion of a crosslinked polymer and a number of linear polymer chains, a part of the respective linear polymer chain penetrating into said body portion and the remaining part extending outwardly therefrom, are free from the drawbacks of heretofore proposed coating use resins, and are able to use either singularly or in the combination form with any other resins customarily used in paint industry, to give excellent coating compositions with good application characteristics and storage stability, capable of resulting a uniform film with excellent appearance, and on the basis of these findings have applied a patent (Japanese Patent Application No. 267019/84).

The present invention is on the same line with that of the prior patent application and concerns a development thereof. Thus, a principal object of the invention to provide novel composite resin particles which can be used either singularly or in the combination with other coating use resins in the known coating compositions as well as in novel coating compositions, which are excellent in application characteristics, storage stability, electrophoresis and the like and capable of resulting uniform coatings with excellent appearance and especially in gloss and distinctness. Additional object of the invention is to provide a method for the preparation of said composite resin particles. Further object of the invention is to provide a resinous composition containing said novel composite resin particles and being useful as resinous vehicle of coating compositions.

SUMMARY OF THE INVENTION

The present inventors have now found that the composite resin particles each of which comprises a crosslinked granular body portion and a number of linear polymer chains, at least part of said linear polymer chains bearing basic functional groups, a part of the respective linear polymer, chains penetrating into the inside of said granular body portion and the remaining part extending outwardly therefrom, are quite useful in paint industries because of having comparatively lower solution viscosities, capability of forming a uniform coating, and being excellent in compatibility with other resins, and electrophoresis, and on the basis of these findings, the inventors have succeeded in coming to the present invention. Thus, according to the present invention, is provided novel composite basic resin particles each of which comprises a granular body portion of a crosslinked polymer having a mean diameter of 0.01 to 10μ, and a number of linear polymer chains, a part of the respective chains penetrating into said body portion and the remaining part extending outwardly therefrom, characterizing by having basic functional groups selected from amino groups and ammonium group on at least part of said linear polymer chains. The invention also provides a preparation method of said resin particles and a resinous composition containing the same.

PREFERRED EMBODIMENTS OF THE INVENTION

The novel composite resin particles of the present invention are characterized in that since each particle comprises a granular body portion of a crosslinked polymer and a number of linear polymer chains, an average grain size is larger than that of the original particle of the crosslinked polymer, the grain size being at most 2.5 times the original size of said crosslinked polymer particle.

Also, the solution viscosity of the resinous composition is significantly low as compared with that of the mere blend of the cross-linked polymer particles and the linear polymer concerned.

The granular body portion is composed of a crosslinked polymer and has a mean diameter of 0.01 to 10μ, the polymer being of polycondensation type as polyester resin, epoxy resin and amino resin or of addition polymerization type as acrylic resin and vinyl resin. Such resin particles may be advantageously prepared by any of the known processes as, for example, an emulsion polymerization, a non-aqueous dispersion polymerization or a solution polymerization, and the product may be, according to the preparation, used as it is, or after separation and pulverization as desired.

The linear polymer chain is characterized by being composed of a linear polymer prepared by the addition polymerization of (a) polymerizable ethylenic compound(s).

In this invention, at least part of said linear polymer chains must bear basic functional groups selected from amino groups and ammonium group.

For this end, amoung the total polymerizable ethylenic compounds constituting the linear polymer chains, 0.2 to 100% by weight are desirably and advantageously occupied by addition polymerizable ethylenic compounds with basic functional groups.

Examples of such addition polymerizable ethylenic compounds with basic functional groups are acrylates and methacrylates each containing tertiary amino group as, for example, N,N-dimethylaminoethyl acrylate, N,N-dimethylaminoethyl methacrylate, N,N-diethylaminoethyl acrylate, N,N-diethylaminoethyl methacrylate and the like; acid amides each containing tertiary amino group as, for example, N,N-dimethylaminopropyl acrylamide, N,N-dimethylamino propyl methacrylamide and the like; acid amides each containing secondary amino group as, for example, N-methylaminopropyl acrylamide, N-methylaminopropyl methacrylamide, N-ethylaminopropyl acrylamide, N-ethylaminopropyl methacrylamide, N-isopropylaminopropyl acrylamide, N-isopropylaminopropyl methacrylamide and the like. Use can also be made of such addition polymerizable compounds with primary amino groups as the addition reaction products between the compounds having both primary amines and active hydrogens (e.g. ethylene diamine and the like) and the compounds having both isocyanate groups and addition polymerizable ethylene groups (e.g. (meth) acrylic acid isocyanate ethyl and the like), and other polymerizable primary amines like allyl amine.

It is also possible to use a polymerizable compound containing a quanternary ammonium group as, for example, 2-hydroxy-3-methacryloxypropyl trimethylammonium chloride, methacrylamide propylhydroxyethyl dimethylammonium acetated and the like. Examples of other optional polymerizable ethylenic compounds used together with the aforesaid ethylenic compounds with basic functional groups are acrylic acid, methacrylic acid, itaconic acid, maleic acid, fumaric acid and their esters, styrene, vinyl toluene, acrylonitrile, vinyl acetate, acrylamide, N-methylol acrylamide and other similar monomers. Employable acrylic or methacrylic esters may be represented by the formula:

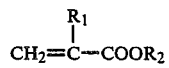

$$CH_2=C-COOR_2$$
(with $R_1$ above C)

wherein $R_1$ is H or $CH_3$ and $R_2$ is a saturated hydrocarbon having 1 to 15 carbon atoms, including methyl acrylate, methyl methacrylate, butyl acrylate, butyl methacrylate, lauryl acrylate, lauryl methacrylate and the like. Other esters may include the members represented by the abovesaid formula wherein $R_2$ is a saturated hydrocarbon bearing hydroxyl group. Examples of such members are hydroxy propyl acrylate, hydroxy propyl methacrylate, 2-hydroxy ethyl acrylate, and 2-hydroxy ethyl methacrylate.

The present composite resin particles are easily and advantageously prepared by the method wherein the aforesaid addition polymerizable ethylenic compound(s) with basic functional group(s) and other optional addition polymerizable ethylenic compound(s) is (are) polymerized by a solution polymerization in the presence of crosslinked polymer particles which will constitute the granular body portion of each resin particle.

That is, any of the known solution polymerization techniques may be advantageously used as, for example, by adding into a reaction vessel a radical polymerization initiator (e.g. organic peroxide or organic azo compound), solvent(s), crosslinked polymer particles and polymerizable monomer(s) and heating the mixture to effect polymerization, or by placing, in a reaction vessel, organic solvents and adding, under heating, dropwise a polymerization initiator, crosslinked polymer particles and monomers, or by the combination of said techniques.

As already stated, the amounts of monomer bearing basic functional group are selected in a range of 0.2 to 100% by weight of the total monomers that constitute the linear polymer chains. This is because if the basic monomer content is less than 0.2% by weight of the total monomers, it is unable to give the desired electrical properties to the resulted composite resin particles and to obtain the desired improvements in gloss and distinctness of the resulted coating.

The present composite resin particles are, owing to the specific preparation method used, characterized by having the specific structure of the so-called semi-interpenetrating polymer network, wherein a part of the respective polymer chain penetrates into the inside of the crosslinked polymer particle and the remaining part extends outwardly therefrom. The said composite resin particles are strictly distingushed from the mere blend of crosslinked polymer particles and linear polymer, in which case a number of linear polymer chains are merely attached to the respective crosslinked polymer particle, in respect of, inter alia, viscosity behavior or the like.

Though the weight ratio of crosslinked polymer/linear polymer in the present composite resin particle may considerably vary with the intended use, the kind of polymer and the like, it is generally determined in a range of 100 parts by weight of the crosslinked polymer / 5 to 1000 parts by weight of the linear polymer.

It is, of course, possible to increase or decrease the amount of the linear polymer than the abovesaid range. The basic functional groups may be carried uniformly on every linear polymer chains or carried on at least part of said polymer chains. Therefore, the solution polymerization of addition polymerizable ethylenic compounds may be carried out in multiple stages and the ethylenic compound having basic functional group may be added in the desired quantity at the desired polymerization stage.

The present composite resin particles are, after being dispersed in an organic solvent, used in a paint industry. As the organic solvent, any of the members customarily used in coating compositions may satisfactorily be used, including aromatic hydrocarbons (e.g. toluene, xylene), aliphatic hydrocarbons, alcohols, ethers, esters, ketones and the like. The thus obtained dispersions may be used as they are or in combination with the other resinous vehicles, in either conventional or novel type coating compositions. In the present invention, crosslinked polymer particles and basic linear polymer are closely bound together by the adoption of solution polymerization technique, thereby forming composite resin particles of the novel structure hereinbefore sated.

The inventors have also succeeded in having a novel coating composition with said resin particles, which has excellent properties in regard to viscosity, film appearance, and especially gloss and distinctness, application characteristic, stability and film-forming property. The desired electrical properties may also be given to the coating.

The inventors have also found that further improvements in gloss and distinctness may be attained with the combination of the present composite resin particles and the resin having acidic groups as carboxyl group, sulfonic acid group, phosphoric acid group and the like.

The invention shall be now more fully explained in the following examples. Unless otherwise being stated, all parts are by weight.

MANUFACTURING EXAMPLE 1

Preparation of crosslinked polymer particles (1)

Into a glass reactor fitted with a thermometer, a reflux condenser, a nitrogen gas inlet tube and a stirrer, were placed 200 parts of deionized water, 3 parts of sodium lauryl sulfate and 1 part of ammonium persulfate and the mixture was, while introducing a nitrogen gas, heated to 80° to 85° C. To this, a monomer mixture of 40 parts of methyl methacrylate, 20 parts of styrene, 20 parts of isopropyl acrylate and 20 parts of ethyleneglycol dimethacrylate was, while continuing stirring, dropwise added over 1 hour and after completion of said addition, the mixture was further reacted for 1 hour under stirring.

From the thus obtained emulsion, water was removed off in vacuo to obtain 100 parts of crosslinked polymer particles (1) having a mean diameter of 110nm and a crosslinking density of $1.01 \times 10^{-3}$ mol/g. The grain diameter was determined by a quasi-elastic light-scattering photometer with a laser beam. The crosslinking density was determined by the following equation.

$$\text{crosslinking density (mol/g)} = \frac{\text{content of crosslinking agent(wt \%)}}{\text{molecular weight of crosslinking agent} \times 100}$$

MANUFACTURING EXAMPLE 2

Preparation of crosslinked polymer particles (2)

Preparation of dispersion-stabilizing resin:

Into a glass reactor fitted with a thermometer, a reflux condenser, a nitrogen gas inlet tube, a stirrer and a decanter, were placed 191 parts of hydroxyl ethyl taurine, 140 parts of ethyleneglycol, 170 parts of triethyleneglycol, 331 parts of adipic acid, 168 parts of phthalic anhydride and 40 parts of xylene, and the mixture was heated. The thus formed water was azeotropically removed off with xylene. The content's temperature was raised to 190° C. in about 2 hours from the commencement of reflux, and stirring and dehydration were continued until the acid value (equivalent to carboxylic acid) reached to less than 10. At this stage, the reaction was stopped to obtain a dispersion-stabilizing polyester resin having an acid value of 79, hydroxyl number of 79 and $\overline{Mn}$ of 708.

Preparation particles (2):

Into a glass reactor fitted with a thermometer, a reflux condenser, a nitrogen gas inlet tube and a stirrer, were placed 150 parts of deionized water, 15 parts of the abovementioned dispersion-stabilizing polyester resin and 2 parts of dimethyl aminoethanol, and the mixture was heated to 80° C. under stirring to obtain a solution. To this, was dropwise added a solution of monomer mixture comprising 20 parts of n-butyl acrylate, 40 parts of styrene and 40 parts of ethyleneglycol dimethacrylate, and 1 part of azo-bis-cyanovaleric acid in 20 parts of deionized water and 0.7 part of dimethyl ethanol amine, in 1 hour. Thereafter, the mixture was stirred for additional 1 hour. From the thus obtained emulsion, water was removed off in vacuo to obtain 110 parts of crosslinked polymer particles (2) having a mean diameter of 40 nm and a cross linking density of $2.02 \times 10^{-3}$ mol/g.

MANUFACTURING EXAMPLE 3

Preparation of crosslinked polymer particles (3)

Into the similar reaction vessel as used in Manufacturing Example 1, were placed 170 parts of deionized water, 5 parts of the dispersion-stabilizing polyester resin prepared in Manufacturing Example 2 and 2 parts of dimethyl aminoethanol, and the mixture was, under stirring, maintained at 80° to 85° C. to obtain a solution.

Next, was added dropwise a solution of the monomer mixture comprising 30 parts of methyl methacrylate, 20 parts of n-butyl acrylate, 40 parts of styrene and 10 parts of ehtylene glycol dimethacrylate, and 1 part of azo-bis-cyanovaleric acid in deionized water and 0.7 part of dimethyl aminoethanol, in 1 hour and the mixture was further stirred for additional 1 hour.

From the thus obained emulsion, water was azeotropically removed off with xylene, and the solvent was substituted with xylene to obtain 330 parts of a xylene dispersion (solid 30%) of crosslinked polymer particles (3) having a mean diameter of 150 nm and a crosslinking density of $5.05 \times 10^{-4}$ mol/g.

MANUFACTURING EXAMPLE 4

Preparation of crosslinked polymer particles (4)

Into the similar reaction vessel as used in Manufacturing Example 1, were placed 98 parts of maleic anhydride and 106 parts of diethylene glycol and the mixture was, while stirring and introducing a nitrogen gas thereto, heated at 190° to 200° C. for 6 hours to obtain diethylene glycol maleate having an acid value of 30.

On the other hand, 1 part of benzoyl peroxide was dissolved in 50 parts of 1,4-butanediol divinyl ether, and to this solution, was uniformly added the abovementioned diethyleneglycol maleate and the mixture was heated at 70° C. for 1 hour to obtain a hard gelation product (unsaturated polyester resin). After completion of the reaction, the thus obtained gelation product was pulverized in a ball mill, and sieved to obtain 150 parts of crosslinked polymer particles having a mean diameter of $6\mu$ and a crosslinking density of $1.39 \times 10^{-3}$ mol/g.

EXAMPLE 1

Into the similar reaction vessel as used in Manufacturing Example 1, were placed 300 parts of the xylene dispersion of crosslinked polymer particles (3) obtained in Manufacturing Example 3, 3 parts of dimethylaminopropyl acrylamide, 5 parts of n-butyl acrylate, 2 parts of 2-hydroxyethyl methacrylate and 0.15 part of azo-bis-isobutyronitrile and the mixture was heated at 110° C. for 5 hours to obtain a dispersion of composite resin particles.

The thus obtained particles had a mean grain diameter of 158 nm, which was bigger than the grain diameter of the original, crosslinked polymer particles (3). Upon subjecting to a spray drying, composite resin particles were obtained.

EXAMPLE 2

Into the similar reaction vessel as used in Example 1, were placed 10 parts of the crosslinked polymer particles (1) obtained in Manufacturing Example 1, 27 parts of styrene, 18 parts of n-butyl acrylate, 27 parts of 2-ethyl hexyl acrylate, 13.5 parts of 2-hydroxyethyl methacrylate, 4.5 parts of dimethylaminoethyl methacrylate and 100 parts of xylene. Next, 6 parts of azo-bisisobutyronitrile were added, and the mixture was stirred and heated at 125° C. for 3 hours to obtain a xylene dispersion of composite resin particles, whose solid content was 50%.

For comparison sake, an acrylic resinous varnish was prepared following the abovesaid procedures but omitting the crosslinked polymer particles (1).

The thus obtained varnish was added with 10 parts of the crosslinked polymer particles (1) prepared separately, and mixed well by means of a laboratory mixer to obtain a comparative composition.

Characteristic properties of the abovesaid two compositions were examined and the results were shown below.

|  | Dispersion of composite resin particles | Comparative composition |
| --- | --- | --- |
| viscosity (cp) | 150 | 340 |
| grain diameter (nm) | 300 | 180 |

From the above, it is clear that the present composite resin particles do have a large grain diameter as compared with those of the original, crosslinked polymer particles and that the viscosity of said dispersion is considerably lower than the viscosity of the comparative composition.

The abovesaid viscosity was determined by using E-type viscometer at 20° C.

EXAMPLE 3

The similar procedures as stated in Example 2 were repeated with 50 parts of crosslinked polymer particles (2), 10 parts of styrene, 10 parts of methyl methacrylate, 21 parts of n-butyl acrylate, 8 parts of 2-hydroxyethyl acrylate, 1 part of diethylaminoethyl methacrylate, 100 parts of xylene, and 5 parts of azo-bis-isobutyronitrile, to obtain a dispersion of composite resin particles. A comparative composition was also prepared following the procedures of Example 2 with the aforesaid raw materials. It was found that the mean grain diameter of the composite resin particles was 1.2 times bigger than that of the crosslinked polymer particles used as the starting material and that the viscosity of the present dispersion is lower than the viscosity of the comparative composition.

EXAMPLE 4

Using the same procedures as stated in Example 2 with 80 parts of crosslinked polymer particles (4), 6 parts of styrene, 4 parts of n-butyl acrylate, 6 parts of 2-ethyl hexyl acrylate, 3 parts of 2-hydroxyethyl methacrylate, 1 part of isopropylaminopropyl methacrylamide, 100 parts of xylene and 1 part of azo-bis-isobutyronitrile, a xylene dispersion of composite resin particles and a comparative composition were prepared.

The former was found to have a bigger grain diameter and a lower viscosity as compared with those of the latter.

MANUFACTURING EXAMPLE 5

Preparation of crosslinked melamine resin particles (5)

Into a glass reaction vessel fitted with a thermometer, a reflux condenser, a nitrogen gas inlet tube and a stirrer, were placed 400 parts of deionized water, 25 parts of the dispersion-stabilizing polyester resin stated in Manufacturing Example 2, and 3.5 parts of dimethylaminoethanol and the mixture was heated to a temperature of 50° to 55° C. under stirring to obtain a solution. To this, were added 150 parts of Sumimal M-50W (melamine resin, trade mark of Sumitomo Chem. Co.) and the mixture was stirred for 20 minutes, heated to 90° C. and continued reaction at the same temperature for 90 minutes. From the thus obtained emulsion, water was removed off in vacuo to obtain crosslinked melamine resin particles (5) having a mean diameter of less than 5μ.

MANUFACTURING EXAMPLE 6

Preparation of crosslinked epoxyresin particles (6)

Into a glass reaction vessel fitted with a thermometer, a reflux condenser, a nitrogen gas inlet tube and a stirrer, were added 400 parts of deionized water, 25 parts of the dispersion stabilizing polyester resin as shown in Manufacturing Example 2, and 3.5 parts of dimethylaminoethanol and the mixture was stirred at a room temperature to obtain a solution. To this, were added 120 parts of ERL-4221 (trade mark of Union Carbide, alicyclic epoxy resin) and the mixture was stirred for 30 minutes. Thereafter, 30 parts of triethylene tetramine were added and the combined mixture was stirred for 40 minutes. The thus formed granular precipitates were separated, washed well with water to remove the adhered triethylene tetramine therefrom, dried and pulverized by an atomizer to obtain crosslinked epoxy resin particles (6) having a mean diameter of less than 5μ.

EXAMPLE 5

The similar procedures as stated in Example 2 were repeated with 50 parts of the crosslinked melamine resin particles (5), 100 parts of xylene, 50 parts of n-butyl alcohol, 20 parts of methyl methacrylate, 16 parts of ethyl acrylate, 8 parts of dimethylaminoethyl methacrylate, 6 parts of hydroxy propyl methacrylate, and 1 part of t-butyl peroxy-2-ethyl hexanoate, to obtain a dispersion of composite resin particles in xylene/n-butyl alcohol.

EXAMPLE 6

The same procedures as stated in Example 2 were repeated with 20 parts of the crosslinked epoxy resin particles (6), 80 parts of xylene, 20 parts of methylisobutyl ketone, 23 parts of styrene, 12 parts of isobutyl methacrylate, 38 parts of n-butyl acrylate, 5 parts of 2-hydroxyethyl acrylate, 2 parts of methacrylamide propyl trimethyl ammonium chloride and 1.5 parts of azo-bis-isobutyronitrile to obtain a dispersion of composite resin particles in xylene/methylisobutyl ketone.

EXAMPLE 7

A xylene dispersion of composite resin particles was prepared by dispersing 50 parts of the composite resin particles (1) in 75 parts of xylene. While stirring in a disper, the dispersion was added with 60 parts of Dianal HR-595 (trade mark of Mitsubishi Rayon, acrylic resin) and mixed well. To the thus obtained disperion of composite resin particles—acrylic resin, were added, while stirring in a disper, 15 parts of U-ban 20SE-60 (trade mark of Mitsuitohatu, melamine resin ) and the combined mixture was stirred well to obtain a clear coating composition. The composition was then adjusted to a #4 Ford cup viscosity of 25 to 30 sec. and applied, by means of an air-spray gun, to a tin plate held vertically so as to give a wet thickness of 35μ. After setting for 5 minutes, the coating was baked at 140° C. for 25 minutes. The thus obtained coating had a PGD value of 0.8 and had an excellent smoothness measured by a visual observation. PGD value is a measure of the distinctness of the coating and becomes bigger in proportion to the goodness of the same. In these experiments, the said value was determined by using a Portable Distinctness of Image Grossmeter (manufactured by Nippon Shikisai Kenkyusho).

composition was then prepared as in Example 8, excepting using a dispersion of 40 parts of the abovesaid resin particles in 40 parts of xylene and a coating was then prepared as in Example 8. The evaluation test results are shown in Table 1.

TABLE 1

|  | composite resin particles | organic solvent | melamine resin | acrylic resin | PGD value | appearance (Smoothness) |
|---|---|---|---|---|---|---|
| Example |  |  |  |  |  |  |
| 9 | dispersion of resin particles of Example 3 (100 parts) | — | U-ban 20SE-60 (15 parts) | Dianal HR-595 (60 parts) | 1.0 | excellent |
| 10 | dispersion of resin particles of EX. 4 (100) | — | U-ban 20SE-60 (15) | Dianal HR-595 (60) | 0.9 | excellent |
| 11 | dispersion of resin particles of Ex. 5 (100) | — | U-ban 20SE-60 (15) | Dianal HR-595 (60) | 0.8 | excellent |
| 12 | dispersion of resin particles of Ex. 6 (100) | — | U-ban 20SE-60 (15) | Dianal HR-595 (60) | 0.8 | excellent |
| Comp. Ex. |  |  |  |  |  |  |
| 1 | (see Comparative Example 1) |  | U-ban 20SE-60 (15) | Dianal HR-595 (60) | 0.6 | good |
| 2 | (see Comparative Example 2) |  | U-ban 20SE-60 (15) | Dianal HR-595 (60) | 0.6 | good |

EXAMPLE 8

Into a disper, 80 parts of the xylene dispersion of the composite resin particles obtained in Example 2, 30 parts of U-ban 128 (trade mark of Mitsuitohatu, melamine resin) and 70 parts of Beckosol 1307-60-EL ( trade mark of Dainippon Ink, alkyd resin ) were added and the mixture was stirred to obtain a clear coating composition. This was adjusted to a #4 Ford cup viscosity of 25 to 30 sec. and applied, by means of an air-spray gun, to a tin plate held vertically so as to give a wet thickness of 30μ. After setting for 5 minutes, the coating was baked at 140° C. for 25 minutes. The thus obtained coating had a PGD value of 0.9 and had an excellent smoothness measured by a visual observation.

EXAMPLES 9 to 12

Clear coating compositions were prepared according to the procedures of Example 7 with the prescriptions as given in Table 1. The respective composition was then applied to a tin plate and baked, and the thus obtained coating was evaluated as in Example 7. The test results are shown in Table 1.

COMPARATIVE EXAMPLE 1

The comparative composite resin particles were prepared as in Example 1, excepting substituting styrene for dimethyl aminopropylacrylamide. Using 50 parts of the thus obtained resin particles and following the procedures of Example 7, a coating composition and a coating were prepared as in Example 7. The evaluation test results are shown in Table 1.

COMPARATIVE EXAMPLE 2

The comparative composite resin particles were prepared as in Example 2, excepting substituting acrylic acid for dimethylaminoethyl methacrylate. A coating

What is claimed is:

1. Composite basic resin particles each of which comprises a granular body portion of crosslinked polymer having a means diameter of 0.01 to 10μ and a number of linear polymer chains, said crosslinked polymer selected from the group consisting of polyester resin, epoxy resin, amino resin, acrylic resin and vinyl resin, a part of the respective linear polymer chain penetrating into the inside of said granular body portion and the remaining part extending outwardly therefrom, and at least part of said linear polymer chains bearing basic functional groups selected from amino groups and ammonium group.

2. The composite basic resin particles according to claim 1 wherein each of the linear polymer chains is composed of a polymer or a copolymer of addition polymerizable ethylenic compounds, and 0.02 to 100% by weight of the total addition polymerizable ethylenic compounds that constitute said linear polymer chains are the ethylenic compounds having basic functional groups.

3. A method of preparing composite basic resin particles each of which comprises a granular body portion of crosslinked polymer having a means diameter of 0.01 to 10μ and a number of linear polymer chains, said crosslinked polymer selected from the group consisting of polyester resin, epoxy resin, amino resin, acrylic resin and vinyl resin, a part of the respective linear polymer chain penetrating into the inside of said granular body portion and the remaining part extending outwardly therefrom, and at least part of said linear polymer chains bearing basic functional groups selected from amino groups and ammonium group, which is characterized in that addition polymerizable ethylenic compounds, at least part of which are ethylenic compounds having basic functional groups selected from amino groups and ammonium group are subjected to a solution polymerization in the presence of crosslinked polymer particles having a means diameter of 0.01 to 10μ, said crosslinked polymer selected from the group consisting of polyester resin, epoxy resin, amino resin, acrylic resin and vinyl resin.

4. The method according to claim 3, wherein the ethylenic compounds having basic functional groups selected from amino groups and ammonium group are used in an amount corresponding to 0.2 to 100% by weight of the total addition polymerizable ethylenic compounds.

5. The method according to claim 3 wherein the solution polymerization is carried out in multiple reaction steps.

6. A resinous composition for coating use comprising composite basic resin particles dispersed in an organic solvent, each of the resin particles comprising a granular body portion of crosslinked polymer having a mean diameter of 0.01 to 10μ and a number of linear polymer chains, said crosslinked polymer selected from the group consisting of polyester resin, epoxy resin, amino resin, acrylic resin and vinyl resin, a part of the respective liner polymer chain penetrating into the inside of said granular body portion and the remaining part extending outwardly therefrom, and at least part of said linear polymer chains bearing basic functional groups selected from amino groups and ammonium group.

7. The composition according to claim 6 wherein the organic solvent is selected from the group consisting of an aromatic hydrocarbon, aliphatic hydrocarbon, alcohol, ether, ketone and ester.

* * * * *